Figure 1:
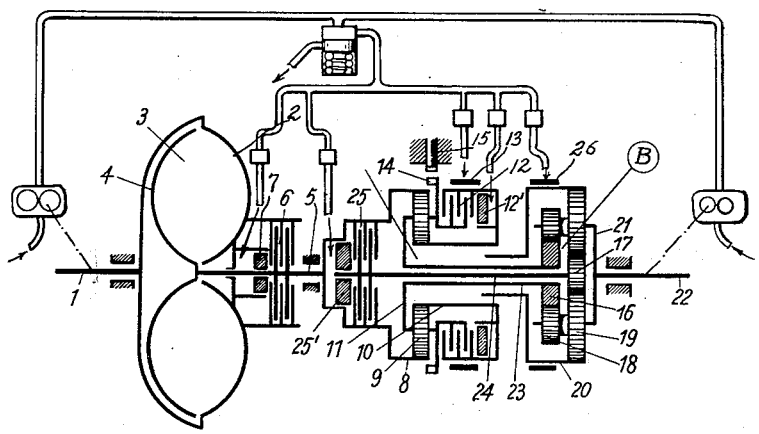

Nov. 9, 1954  H. J. M. FÖRSTER  2,693,721
PLANETARY GEARING
Filed May 18, 1950  2 Sheets-Sheet 1

Inventor
Hans Joachim Max Förster
By hlicke and Padlon
Attorneys

United States Patent Office 2,693,721
Patented Nov. 9, 1954

2,693,721

PLANETARY GEARING

Hans J. M. Förster, Harthausen, Kreis Esslingen, Germany, assignor to Daimler-Benz Aktiengesellschaft, Stuttgart-Unterturkheim, Germany Application May 18, 1950, Serial No. 162,727

Claims priority, application Germany May 20, 1949

29 Claims. (Cl. 74—732)

The invention relates to planetary gearing or a planetary gearing aggregate, especially for motor vehicles and intends above all to obtain the largest possible number of gear ratios by the simplest means possible. Furthermore a simple shifting method is realized. The invention relates especially to such planetary gearings in which pairs of planet wheels (in the following called "double planetary gears") are provided which rotate together and are supported on one common planet bearer or carrier. One feature of the invention is essentially that each of the two planet wheels rotating together is engaged with one central wheel, especially a sun gear and that at least one of the two central wheels which preferably are of different size is adapted to be driven and one to be braked. Or two central wheels can be braked individually or simultaneously. Furthermore one of the driven central wheels or also both of them can be formed to be locked. Or four central wheels on the whole can for instance be provided engaged with the two sets of planet wheels, two of which can be driven and two can be braked. For the drive, sun gears serve suitably, while the further transfer of the drive is preferably done by the planet gear carriers supporting the double planets.

By the invention the largest possible number of gear ratios can be provided with relatively few gears and an easy shifting can be achieved by a simple breaking or coupling of the gearing members. Especially by the addition of a second sun gear an overdrive or a reverse gear can be obtained without any further gears or other gearing members being necessary.

Especially with the use of two sun wheels and one drum wheel adapted to be braked the following gear steps can be obtained:

(1) For instance a low gear ratio by locking the outer drum wheel and driving of one, for instance the larger one of two sun gears of different size, while the other one of these is in idling position,
(2) A direct gear drive by locking the planetary gearing in itself, so that it rotates as a unit,
(3) Either a gear producing a faster speed by locking the smaller of the two sun gears and drive of the larger one of them or, respectively furthermore
(4) A reverse gear by locking the larger of the two sun gears and drive of the smaller one of them.
(5) Furthermore by the simultaneous drive of both sun gears a further, for instance a low gear drive can be realized, if the drive is effected with different speeds.
(6) Further gear ratios can be obtained by driving the second, i. e. for instance the smaller of the two sun gears, while the other (for instance the larger) sun gear is in idling position and locking the outer ring gear, furthermore if a second ring gear is arranged, by locking this and driving one or the other sun gear.

By reason of a suitable graduation of the transmission or also by reason of a favourable local arrangement of the shifting elements it is, however, often or generally more advantageous to use only part of these transmission possibilities for the shifting of the gearing and to put before the double planetary gearing an additional transmission, for instance a further changeable planetary gearing which in some cases can serve at the same time to obtain different speeds of the two central wheels apt to be driven of the double planetary gearing. Such an additional gearing can be put before both central wheels or—which is usually sufficient and advantageous with regard to the small space requirements—to one of these central wheels apt to be driven. The additional gearing can for instance be shifted by locking one gearing part and locking the whole gearing.

It can be connected in series with the double planetary gearing in such a way that any of for instance three available transmission steps of the double planetary gearing can be connected with any of the for instance two transmission steps of the other planetary gearing put ahead thereof so that for instance six forward steps can be obtained altogether.

In order to be able to brake both sun gears of the double planetary gearing the sun wheel which is not easily accessible from outside is, according to a further feature of the invention, braked by brake members extending through a hollow drive shaft or driven shaft. This is achieved suitably for instance with an arrangement of the gearing at the rear axle, through the hollow gearing shaft driving the rear axle gearing which for this purpose can be formed case-like.

If it is not possible or suitable to form both sun gears of the double planetary gearing in such a way that they can be driven or braked, the arrangement can be made so that only one sun gear can be driven and the other can be braked and thus an overdrive or reverse gear can be obtained, while for achieveing the other of these two gears (for instance the reverse gear) a special transmission is provided. Then in connection with the gearing of the invention a reverse transmission for one or several reverse gears is obtained in the most suitable and simple way by a further central gear (especially an outer ring gear) which can be braked and is connected with one of the planetary gearings, especially with the double planetary gearing and with which the planet wheels of this gearing are or can be engaged by the interposition of reverse planet wheels supported on the same planet wheel bearer. Or a reverse transmission of any kind can be put before or behind the gearing.

By a suitable arrangement of the disk-shaped planet bearers, coupling disks and brake disks in one another a very short construction with only two bearings can be achieved. With the use of electromagnetic clutches such a construction can be realized in an especially suitable way and with an easy and comfortable shifting of the gearing. Besides the shifting of the clutches and brakes can be effected by a hydraulic shifting means respectively by another auxiliary means or in any other suitable way.

Suitably a hydrodynamic coupling is arranged before the gearing, by which the gearing can be driven with slip by the driving engine at the starting respectively at low speeds. A clutch operated for instance hydraulically can be provided in order to lock the hydrodynamic coupling, preferably at higher speeds and thus to combine a soft starting with a high efficiency of the gearing. At the same time the shifting is further facilitated by the hydrodynamic coupling arranged ahead of the gearing.

Instead of the hydrodynamic coupling any other kind of clutch (for instance a friction coupling or an electromagnetic clutch) can be arranged ahead of the gearing. In some cases, if the brake members in the gearing are formed large enough, such a coupling can be wholly omitted, when the starting is effected by braking gradually the rotating wheels.

In the design three examples of the invention, for instance for a motor vehicle drive, are shown.

Figure 2:
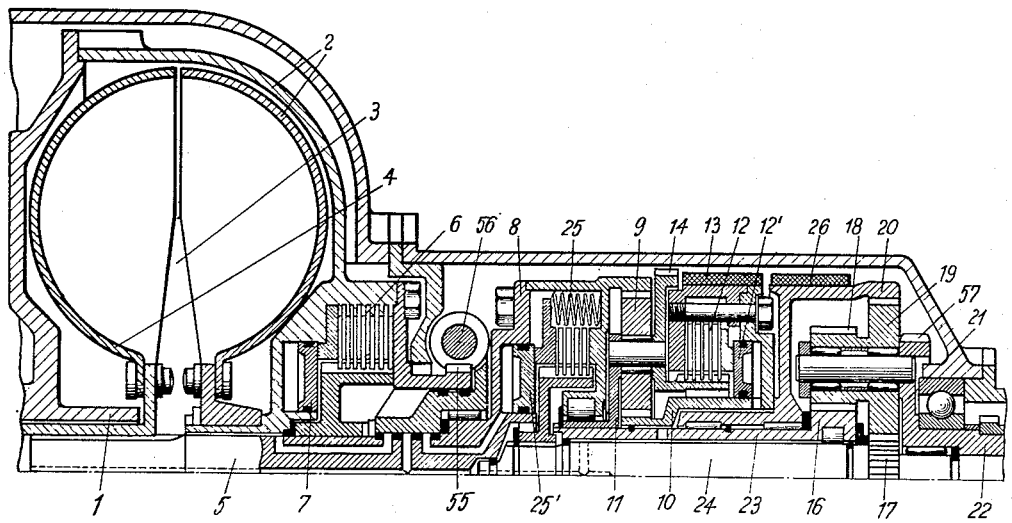
Figure 3:
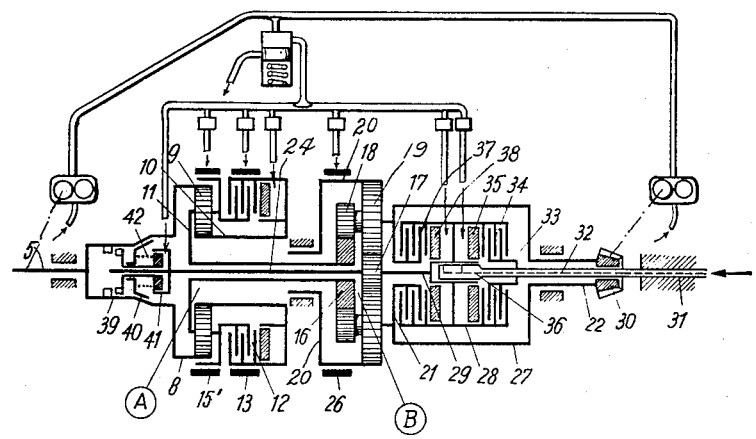
Figure 4:
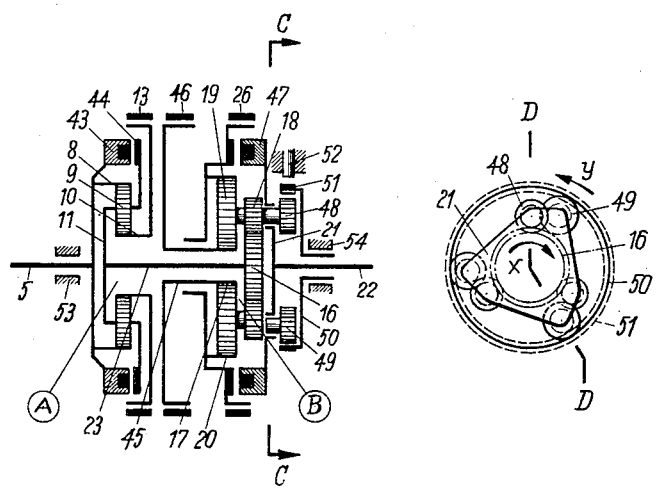
Figure 5:
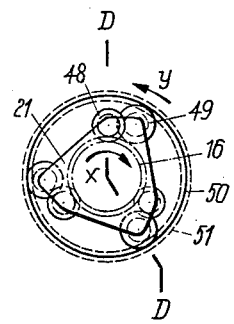

Fig. 1 shows a schematic view of a gearing with two sun gears—adapted to be driven—of the double planetary gearing, one of which can be locked, Fig. 2 an essentially corresponding example in constructive reproduction, Fig. 3 a corresponding gearing, in which however both sun gears can be driven and braked, Fig. 4 a gearing with two sun gears of the double planetary gearing of which only one can be driven and the other can be braked (partially in the section according to line D—D of Fig. 5) and Fig. 5 a cross section according to line C—C of Fig. 4, which shows the special reverse transmission of the gearing.

In Figs. 1 and 2 the number 1 is the drive shaft, for instance the crankshaft of a fuel power engine or a shaft driven thereby. Firmly connected with the shaft is the pump half 2 of the hydrodynamic coupling 3, whose turbine half 4 in turn is solidly connected with the gearing drive shaft 5. The hydrodynamic coupling is for instance formed without inner channel walls with a purely radial blading and is suitably used with slip for starting, respectively for operation at the low speed ranges only. A clutch 6 (for instance a lamella clutch) which is operated for instance hydraulically by means of a piston 7 can directly connect the pump half 2 of the hydrodynamic coupling with the gearing drive shaft 5, whereby the coupling can be operated by the driver or also automatically, dependent on the engine speed or the car speed. In the latter case the clutch 6 is applied automatically as soon as the turbine coupling half 4 of the hydrodynamic coupling exceeds a certain speed, or the vehicle exceeds a certain driving speed, while at a speed below a certain limit which suitably is lower than the speed at which the engagement takes place, an automatic disengagement of the clutch 6 can take place.

The gearing drive shaft 5 drives a planetary gearing A. The latter consists of the outer drum wheel or ring gear 8 connected with the drive shaft 5, the planet wheels 9, the sun gear 10 and the planet carrier 11. Sun gear 10 and planet carrier 11 can be engaged with each other by a lamella clutch 12 operated for instance hydraulically by the piston 12' and thus lock the planetary gearing A in itself, so that it rotates together as a unit.

A brake 13 (for instance also hydraulically operated) serves to lock the sun gear 10 relative to the casing. Furthermore the planet carrier 11 has a gear rim 14 in which a pawl or latch 15 is engaged, or an other suitable locking device by which the planet carrier 11 is prevented from rotating.

To the rear of the planetary gearing A a double planetary gearing B is arranged. This consists of the two sun gears 16 and 17, the pairs of planet wheels or double planets 18 and 19, arranged coaxially with each other, an outer drum wheel 20 and the planet carrier 21 which drives the driven shaft 22 of the gearing. The larger sun gear 16 is solidly connected with the planet carrier 11 of the planetary gearing A by a hollow shaft 23, while the smaller sun gear 17 is firmly arranged on an inner central shaft 24. The latter can be engaged with the gearing drive shaft 5, respectively the drum gear 8 of the planetary gearing A by means of a lamella clutch 25 operated for instance hydraulically by the piston 25'. The drum wheel 20 of the planetary gearing B can be braked with respect to the casing by a brake 26 (operated for instance also hydraulically).

The gearing makes for instance the following shiftings possible:

*First gear.*—Brake 13 of the planetary gearing A and brake 26 of the planetary gearing B engaged, clutch 25 and 12 released (the ratchet 14, 15 is not engaged for all forward speeds). The drive is then effected from the shaft 5 over the drum wheel 8, the planet gears 9, the planet carrier 11 (which in this case rotates at a lower speed than the drum wheel 8), the hollow shaft 23, the sun gear 16, the planet gears 18 and 19, the planet carrier 21 (which rotates at a lower speed than the sun gear 16) to the driven shaft 22. Thus both A and B reduce to a lower speed ratio.

*Second gear.*—Clutch 12 and brake 26 engaged, clutch 25 and brake 13 released. The drive is effected from the shaft 5 over the planetary gearing A locked by the clutch 12 and rotating as a unit, the hollow shaft 23, the sun gear 16, the planet gears 18, 19, the planet carrier 21 to the driven shaft 22. A is thus driving directly, B reduces through 16 to a lower speed.

*Third gear.*—Clutch 25 and brake 13 engaged, clutch 12 and brake 26 released. By locking the sun gears 10 by the brake 13 the planetary carrier 11 and with it through the hollow shaft 23 the sun gears 16 of the planetary gearing B is driven with a reduction to a lower speed ratio. At the same time the sun gears 17 of the planetary gearing B is directly driven by the drive shaft 5 through the clutch 25 and the inner shaft 24. The drive is thus divided and the sun gears 17 rotate at a higher speed than the sun gears 16. The diameter ratios of the two sun gears 16 and 17, respectively of the planet gears 18 and 19 can in this case be chosen in such a way that the planet carrier 21, or the driven shaft 22 is driven at a certain speed below that of the drive shaft 5. The total reduction results in about the geometric mean between that of the second gear and the gear ratio of 1 : 1 of the fourth gear.

*Fourth gear (direct drive).*—Clutch 25 and clutch 12 engaged, brakes 13 and 26 released. By the clutch 12 the planetary gearing A is locked in itself. As through the clutch 25 the small sun gear rotates at the drive speed, both sun gears 16 and 17 have the same speed, so that also the planetary gearing B rotates together as a unit. The drive shaft 5 therefore drives the driven shaft 22 directly.

*Reverse gear.*—This is obtained by engaging the latch 15 with the gear 14 of the planet bearer 11. In this case the sun gear 16 of the planetary gearing B is locked through the hollow shaft 23. Furthermore the clutch 25 is engaged, while the clutch 12 and the brakes 13 and 26 are released. The drive is effected from the drive shaft 5 through the clutch 25, the inner shaft 24 to the smaller sun gear 17 of the planetary gearing B, which effects a drive of the pair of planet gears 18, 19 by revolving on the larger sun gear 16 and with this a drive of the planet carrier 21, and of the driven shaft 22 in a reverse rotation.

The operation of the form of construction according to Figs. 1 and 2 may be summarized as follows:

| Drive Ratio | Brake 13 | Brake 26 | Latch 15 | Clutch 25 | Clutch 12 |
| --- | --- | --- | --- | --- | --- |
| First (low) | Engaged | Engaged | Disengaged | Disengaged | Disengaged. |
| Second | Disengaged | do | do | do | Engaged. |
| Third | Engaged | Disengaged | do | Engaged | Disengaged. |
| Fourth (direct) | Disengaged | do | do | do | Engaged. |
| Reverse | do | do | Engaged | do | Disengaged. |

The shifting fluid, for instance oil, for the shifting of the clutches 25 and 12 can suitably be fed through longitudinal and cross bores in the shafts 24 and 23, respectively in the hub of the sun wheel 10. In order to maintain the shifting pressure favorably two pumps are provided, one of which is driven by the engine (for instance by the shaft 1) the other by the drive (for instance by the shaft 22 driving the vehicle axle) and which feeds the fluid to the same lines. The pressure of the fluid is in this case controlled for instance by a spring loaded piston which under a certain pressure opens a return line in the generally known way. By the use of the two pumps the necessary fluid pressure is assured, with a standing car and a running engine (by the front pump) as well as with a driving car and an idling engine (by the rear pump).

The shifting of the different gears can be effected arbitrarily by the driver or also automatically, for instance dependent on the throttle valve opening and the driving speed or on one or several other suitable devices adapted to control the shifting point, by the use of suitable control members.

Fig. 2 shows a constructive example of the gearing aggregate schematically shown in Fig. 1. The front pump for feeding the pressure fluid for the shifting is in this case driven by a shaft 56 driven by a worm wheel 55 connected with the gearing part 2 of the hydraulic coupling. The drive of the rear pump is effected by a worm wheel 57 on the drive shaft 22.

The example according to Fig. 3 differs from that in Fig. 1 essentially in the fact that the locking of the inner gearing shaft 24 with the sun gear 17 is provided. For this purpose the planet carrier 21, respectively the driven shaft 22 is formed case-like, and that case-shaped part 27 includes a drum-shaped part 28 of the shaft 29 as extension of the shaft 24. Through the hollow driven shaft 22 which drives the rear axle gearing of the motor vehicle for instance by means of a bevel gear 30, a rod 32 is put, which is supported at the point 31 in the gearing case and carries a brake part 33. By a lamella brake 34 the drum 28 of the shaft 29 can be engaged with the brake part 33 of the firmly supported rod 32 and thus be braked with respect to the casing. The operation of the brake 34 is effected for instance by a piston 35 to which the shifting fluid is fed in the direction of the arrow through the hollow rod 32 and through a cross bore in the part 36 of the rod 32.

To lock the planetary gearing B as a unit a further lamella clutch 37 can furthermore serve, which can be operated in a similar way as the brake 34 by a piston 38 and can then firmly connect the sun gear 17 with the planet carrier 21.

| Drive Ratio | Brake 13 | Brake 26 | Brake 15' | Clutch 39 | Clutch 12 | Clutch 37 | Brake 34 |
|---|---|---|---|---|---|---|---|
| First | Engaged | Engaged | Disengaged | Disengaged | Disengaged | Disengaged | Disengaged. |
| Second | Disengaged | do | do | do | Engaged | do | Do. |
| Third | Engaged | Disengaged | do | do | Disengaged | Engaged | Do. |
| Third (Alternative) | do | do | do | Engaged | do | Disengaged | Do. |
| Fourth (Direct) | Disengaged | do | do | Disengaged | Engaged | Engaged | Do. |
| Fourth (First Alternative) | do | do | do | Engaged | do | Disengaged | Do. |
| Fourth (Second Alternative) | do | do | do | do | Disengaged | Engaged | Do. |
| Fourth (Third Alternative) | do | do | do | do | Engaged | do | Do. |
| Fifth (Overdrive) | do | do | do | Disengaged | Engaged | Disengaged | Engaged. |
| Reverse | do | do | Engaged | Engaged | Disengaged | do | Do. |
| Further forward Drive | Engaged | do | Disengaged | Disengaged | do | do | Do. |

Furthermore a brake 15' is provided to brake the planet carrier 11. The engaging of the gearing drive shaft 5 with the inner shaft 24 is effected by a claw clutch 39, ahead of which a friction coupling 40 is put which serves to synchronize. The shifting is in this case effected by oil pressure by means of the piston 41. First the friction coupling 40 is brought into contact with the shaft 5, or the drum wheel 8 by the pressure of the spring 42, before the claws of the clutch are engaged. When the oil pressure stops the piston 41 is pressed to the right by the spring 42 and the claw clutch is released.

The adjustment for the first and the second gear is effected in the same way as in the example according to Fig. 1. For the shifting of the third gear the clutch 37 in Fig. 3 is engaged instead of the clutch 25 in Fig. 1. At the same time (as in Fig. 1) the brake 13 is engaged and thus the sun gear 10 of the planetary gearing A is locked. Therefore the planetary gearing A reduces to a lower speed ratio, while the planetary gearing B is locked in itself. If necessary a further gear could be obtained by engaging the clutch 39 with the release of the clutch 37.

In the fourth or direct gear the clutches 12 and 37 are engaged so that (as in Fig. 1) a direct drive is transferred from the drive shaft 5 to the driven shaft 22. Instead of the clutch 12 or the clutch 37 or additionally to these the clutch 39 can also be engaged, if desired.

By the shifting of the brake 34, i. e. by the braking of the smaller sun gear 17, a fifth gear or overdrive can be obtained furthermore. For this purpose the clutch 12 is engaged at the same time with the brake 34, while the clutch 37 and the brakes 15', 13 and 26 are released. The sun gear 16 then rotates with the speed of the shaft 5 and by the revolving of the pair of planet wheels 18, 19 on the locked sun gear 17 effects a drive which produces a higher speed of the planet bearer 21, relates to the drive shaft 5.

By exchanging the drive of the two sun wheels 16 and 17, i. e. by locking the larger sun gear by means of the brake 15' and by the drive of the smaller sun gear 17 by means of the engaged clutch 39 the reverse drive is obtained (as in Fig. 1).

In some cases a further forward drive can be achieved by engaging the brake 13 instead of the clutch 12, while the brake 34 is engaged and therefore the sun gear 17 is braked. Thus A would change to a lower, B to a higher speed, which, according to the different choice of the gears would result in a total change to a higher or lower gear, respectively in a transmission ration of 1:1.

In the case of Figs. 1, 2 or 3 another forward gear can furthermore be obtained by driving the sun gear 17 instead of the sun wheel 16 (as in the first gear). By this an especially large reduction to a low speed ratio is accomplished. Further shifting possibilities could be effected by connecting also the planet gears 18 with another drum wheel that can be braked. The brake for this drum wheel could for instance be arranged between the brakes 13 and 26, the drum wheel 20 being supported on the additional drum wheel, respectively its hub or also for instance on the driven shaft 22. With the locking of the additional drum wheel and the idling position of the sun gear 17 the drive shaft 22 would then, by the drive of the sun gear 16, be driven with a larger reduction to a low speed than in the first, or the second gear, while a drive of the sun wheel 17 with the idling position of the sun gear 16 would give a still lower drive of the drive shaft 22. For the practical use with motor vehicles, however, the four or five forward gear ratios described previously will generally be sufficient.

The operation of the form of construction according to Fig. 3 may be summarized as follows:

In the case of the example according to Figs. 4 and 5 only one sun gear of the double planetary gearing B, i. e. the larger sun gear 16, is driven through the planetary gearing. The drum wheel 8 and the planet carrier 11 of the gearing A, firmly connected with the sun gear 16 by the transmission shaft 23', can in this case be engaged with each other to lock the gearing A by an electromagnetic clutch 43 which operates the ring disk 44 of the planet carrier which serves as armature. The sun gear 10 of the gearing A can again be locked by a brake 13.

The smaller sun gear 17 of the double planetary gearing B which in this case cannot be driven, can be locked through a hollow shaft 45 by the brake 46. The drum or ring gear 20 geared on the inside and engaged with the corresponding planet gear 19 can on the one hand (as in the case of Figs. 1 and 2) be locked by a brake 26 and on the other hand be engaged with the planet gear carrier 21 by an electromagnetic clutch 47, to lock the double planetary gearing.

Arranged axially to the pair of planet gears 18, 19 and firmly connected with these are furthermore the planet gears 48, which are engaged with the internal gear of a drum or ring gear 50 through the reverse planet gears 49 supported on the same planet carrier 21. The drum gear 50 is provided with external teeth and can be locked with respect to the casing by a latch 52 engaged with said teeth.

The whole gearing is supported only in two bearings 53 and 54. The drive shaft 22 firmly connected with the planet carrier 21 transfers the drive for instance to the axle gearing of a motor vehicle. By the disk-shaped form of the planet carriers and a suitable arrangement of planet carriers, coupling and brake disks in one another the gearing can be constructed with a very small length, this being not larger or not essentially larger than half of its diameter.

Apart from the reverse gear the planetary gearing A can effect two gear ratios, the planetary gearing B three gear ratios, so that a total of six gear ratios can be obtained by a serial connection of both gearings, whereby the following gears are possible:

*First gear.*—Brake 13 and 26 engaged, clutches 43 and 47 as well as brake 46 disengaged (the pawl locking device 51, 52 is not engaged for any of the forward speeds). The drive is effected through the following gearing parts: 5. 8, 9, 11 (with a reduction to a low speed), 23', 16, 18, 21 (with another reduction of speed), 22.

*Second gear.*—Clutch 43 and brake 26 engaged, brake 13 and 46 as well as clutch 47 disengaged. The drive is the same as in the first gear, but the planetary gearing A rotates together as a unit.

*Third gear.*—Brake 13 and clutch 47 engaged, clutch 43 as well as brakes 46 and 26 disengaged. The planetary gearing B rotates as a unit, while the planetary gearing A transfers a reduction to a low speed ratio corresponding to the first gear.

*Fourth gear (direct drive).*—Clutches 43 and 47 engaged, brakes 13, 46 and 26 disengaged. Both planetary gearings are locked in themselves so that a direct drive from the drive shaft 3 to the driven shaft 22 is transferred.

*Fifth gear.*—Brakes 13 and 46 engaged, clutches 43 and 47 as well as brake 26 disengaged. In this case the planetary gearing A reduces to a lower speed, the planetary gearing B changes to a higher speed. The gear sizes in both planetary gearings are suitably chosen in such a way that on the whole a change to a higher speed ratio is effected, with a graduation corresponding to the other gear steps, i. e. especially a transmission forming the geometrical means between the transmissions of the fourth and the sixth gear.

*Sixth gear.*—Clutch 43 and brake 46 engaged, brakes 13 and 26 as well as clutch 47 disengaged. The planetary gearing A transfers a direct drive, the planetary gearing B a change to a higher speed corresponding to the fifth gear.

For the shifting to a reverse drive the latch 52 is engaged with the gear 51 of the the drum or ring gear 50 and thus this is locked with respect to the casing. If now the sun gear 16 is driven in the direction of the arrow *x* on Fig. 5 the reverse gears 49 rotate in the direction of the arrow *y* on the locked drum or ring gear 50 and take the planet carrier 21, and the driven shaft 22 with them in the corresponding reverse rotation. By an arbitrary engaging of the brake 13 respectively the clutch 43 a reverse drive with a lower or a higher reduction to a low speed can be obtained.

The operation of the form of construction according to Figs. 4 and 5 may be summarized as follows:

with one sun gear of the second planetary gearing, an inner shaft connected with the second sun gear of the second planetary gearing and extending through the named hollow shaft, coupling means to connect this inner shaft with the named means to drive one of the gearing members of the first planetary gearing and means to further transfer the drive through one of the two further gearing members of the second planetary gearing.

4. Planetary gearing aggregate according to claim 3, in combination with means to brake the fourth gearing member of the second planetary gearing.

5. Planetary gearing including a planet carrier, two sets of planet gears of different diameters, supported coaxially and connected with each other in pairs, a sun gear of a larger diameter, engaged with the planet gears of a smaller diameter, a sun gear of a smaller diameter engaged with the planet gears of larger diameter, means to drive the larger sun gear, means to brake the smaller sun gear, at least one further set of reverse planet gears independent of said first-named sets, means for supporting said further set on the planet carrier in meshing relationship with the other planet gears for planetary rotation therewith, a central gear cooperating with said reverse planet gears and means to brake the central gear.

6. Planetary gearing according to claim 5, in combination with at least one outer central gear, means to

| Drive ratio | Brake 13 | Brake 46 | Brake 26 | Clutch 43 | Clutch 47 | Latch 52 |
|---|---|---|---|---|---|---|
| First | Engaged | Disengaged | Engaged | Disengaged | Disengaged | Disengaged. |
| Second | Disengaged | do | do | Engaged | do | Do. |
| Third | Engaged | do | Disengaged | Disengaged | Engaged | Do. |
| Fourth (Direct) | Disengaged | do | do | Engaged | do | Do. |
| Fifth (First Overdrive) | Engaged | Engaged | do | Disengaged | Disengaged | Do. |
| Sixth (Second Overdrive) | Disengaged | do | do | Engaged | do | Do. |
| Reverse | do | Disengaged | Disengaged | do | do | Engaged. |
| Low Reverse | Engaged | do | do | Disengaged | do | Do. |

Instead of electromagnetic clutches also friction couplings operated mechanically or hydraulically or other suitably formed couplings can be used. Also the brakes can be operated mechanically, electrically, hydraulically or pneumatically or in any other way. Instead of the latches also a suitable brake can be provided. In all cases a hydrodynamic coupling can be arranged before the gearing, and all explanations to the example according to Figs. 1, 2 and 3 are correspondingly valid also for those according to Figs. 4 and 5.

The expression "central gear" as used herein is to be understood as any gear whose axis or rotation is central, viz., coaxial with the shafts 5, 24 and 22, and may therefore be a sun gear such as 9, 16, 17 of Figs. 1, 2 or 3 and 10, 45 or 16 of Fig. 4, or it may be a ring gear such as 8 or 20 of Figs. 1, 2, 3 or 4.

What I claim is:

1. Planetary gearing aggregate including a first planetary gearing consisting of an outer central gear, a planet carrier having a set of planet gears and a sun gear and a second planetary gearing consisting of a planet carrier, two substantially identical sets of planet gears, each of which consists of a pair of connected coaxial planet gears, at least three central gears, means to connect at least one of the three gearing parts of the first which at least one of the four gearing parts of the second planetary gearing, means to brake a second of the three gearing parts of the first and means to brake a second of the four gearing parts of the second planetary gearing, together with means to drive only one further gearing part of only one of said two planetary gearings, and means for a further transfer of the drive from another further gearing part of the other of said two planetary gearings.

2. Planetary gearing aggregate according to claim 1, in combination with means to brake the fourth gearing part of the second planetary gearing.

3. Planetary gearing aggregate including a first planetary gearing consisting of an outer central gear, a planet carrier with a set of planet gears and a sun gear and a second planetary gearing consisting of a planet carrier having two sets of substantially identical planet gears each consisting of connected coaxial planet gears, and at least three central gears, two of which are sun gears, means to drive one gearing part of the first planetary gearing, means to brake a second gearing part of the first planetary gearing, a hollow shaft connected with the third gearing part of the first planetary gearing and brake said outer central gear and to couple two gearing members of the planetary gearing with each other in such a way that the planetary gearing rotates as a unit.

7. Planetary gearing including a drive shaft, two sun gears having different diameters, at least the larger of them being connected to be driven by the drive shaft, means to lock at least the other sun gear, a planet carrier, sets of planet gears connected with each other in pairs, one of which is engaged with the one and the other with the other sun gear, an outer central gear engaged with one of the two planet gears, means to brake the outer central gear, and a driven shaft connected with the planet carrier, one of the two named shafts being formed hollow and the means to brake the one sun gear extending through the hollow shaft.

8. Planetary gearing including a drive shaft, two sun gears having different diameters, at least the larger of them being connected to be driven by the drive shaft, means to lock at least the other sun gear, a planet carrier, sets of planet gears connected with each other in pairs, one of which is engaged with the one and the other with the other sun gear, an outer central gear engaged with one of the two planet gears, means to brake the outer central gear, and a driven shaft connected with the planet carrier, the driven shaft being formed as a casing containing the means to brake the one central gear, together with means to lock the planetary gearing so as to form one rotating unit.

9. Planetary gearing comprising a first planetary gearing consisting of an outer central gear, a planet carrier having a set of planet gears and a sun gear, and a second planetary gearing consisting of a planet carrier having sets of planet gears each of which comprises a plurality of connected coaxial planet gears, and at least three central gears, two of which are sun gears, means for driving the outer central gear of the first planetary gearing, means for braking the sun gear of the first planetary gearing, a hollow shaft connected with the planet carrier of the first planetary gearing and with one of the sun gears of the second planetary gearing, an inner shaft connected with the second sun gear of the second planetary gearing which shaft passes through said hollow shaft, coupling means for coupling this inner shaft with said means for driving the outer central gear of the first planetary gearing, and means for transmitting the drive through one of the two further gear members of the second planetary gear.

10. Planetary gear unit according to claim 9, in which said coupling means is constructed as synchronizing coupling.

11. Planetary gear unit according to claim 9, in combination with coupling means for coupling two gear parts of the first planetary gear and with coupling means for coupling two gear parts of the second planetary gear with each other.

12. Planetary gear unit according to claim 9, in combination with coupling means for coupling two gear parts of the first planetary gear and with coupling means for coupling two gear parts of the second gear part with each other and furthermore with means for operating the coupling means and the brake means by hydraulic power.

13. Planetary gear unit according to claim 9, in combination with means for braking the fourth gear member of the second planetary gear together with coupling means for coupling two gear parts of the first planetary gear and with coupling means for coupling two gear parts of the second planetary gear with each other; furthermore with means for operating the coupling means and the brake means by hydraulic power.

14. Planetary gearing comprising a first planetary gearing consisting of an outer central gear, a planet carrier having a set of planet gears and a sun gear, and a second planetary gearing consisting of a planet carrier having sets of planet gears each of which comprises a plurality of connected coaxial planet gears and at least two sun gears, means for driving the outer central gear of the first planetary gearing, means for braking the sun gear of the first planetary gearing, a hollow shaft connected with the planet carrier of the first planetary gearing and with one of the sun gears of the second planetary gearing, an inner shaft connected with the second sun gear of the second planetary gearing which shaft passes through said hollow shaft, coupling means for coupling this inner shaft with said means for driving the outer central gear of the first planetary gearing, and means for transmitting the drive through one of the two further gear members of the second planetary gear.

15. A planetary gear unit according to claim 14 comprising also means for coupling the shaft members with each other.

16. A planetary gear unit according to claim 14 in which the inner gear part is a sun wheel and the outer gear part is the planet carrier of the gearing.

17. A planetary gear unit according to claim 14 comprising also means for coupling the shaft members with each other and means for feeding a hydraulic medium through the stationary part to the braking and coupling means inside of the housing shaft member.

18. Planetary gearing, including a planet carrier, a plurality of sets of planet gears supported on the planet carrier, each set connected to rotate together, a central gear engaged with one of the planet gears, another central gear engaged with the other planet gear of said set, a third central gear engaged with one of said planet gears, driving means connected with the first of said central gears, driving means connected with the second of these central gears, means to brake the third of said central gears, a further additional planetary gearing consisting of an outer central gear, a sun gear and a planet carrier supporting planet gears, and means to brake one of said three gearing parts of the additional planetary gearing, in which furthermore one of the named drive means connect a second gearing part of the additional planetary gearing with one central gear of the first mentioned planetary gearing and the other named drive means connect the third gearing part of the additional planetary gearing with the second central gear of the first mentioned planetary gearing.

19. Planetary gearing aggregate including a first planetary gearing consisting of an outer central gear, a planet carrier having a set of planet gears and a sun gear, and a second planetary gearing consisting of a planet carrier, two substantially identical sets of planet gears each of which consists of a pair of connected, coaxial planet gears, at least three central gears, means to connect at least one of the three gearing parts of the first planetary gearing with at least one of the four gearing parts of the second planetary gearing, means to brake a second of the three gearing parts of the first planetary gearing and means to brake a second of the four gearing parts of the secondary planetary gearing, together with means to drive a further gearing part and means for a further transfer of the drive from another further gearing part of the two planetary gearings, one of these gearing parts belonging to the first and the other to the second planetary gearing, and means to connect the fourth gearing part of the second planetary gearing with one of the three gearing parts of the first planetary gearing.

20. Planetary gearing aggregate including a first planetary gearing consisting of an outer central gear, a planet carrier having a set of planet gears and a sun gear, and a second planetary gearing consisting of a planet carrier, two substantially identical sets of planet gears each of which consists of a pair of connected, coaxial planet gears, at least three central gears, means to connect at least one of the three gearing parts of the first planetary gearing with at least one of the four gearing parts of the second planetary gearing, means to brake a second of the three gearing parts of the first planetary gearing and means to brake a second of the four gearing parts of the second planetary gearing, together with means to drive a further gearing part and means for a further transfer of the drive from another further gearing part of the two planetary gearings, one of these gearing parts belonging to the first and the other to the second planetary gearing, means to lock the first planetary gearing in itself, and means to lock the second planetary gearing in itself, so that each of these rotates as a unit.

21. Planetary gearing aggregate including a first planetary gearing consisting of an outer central gear, a planet carrier having a set of planet gears and a sun gear, and a second planetary gearing consisting of a planet carrier, two substantially identical sets of planet gears each of which consists of a pair of connected, coaxial planet gears, at least three central gears, means to connect at least one of the three gearing parts of the first planetary gearing with at least one of the four gearing parts of the second planetary gearing, means to brake a second of the three gearing parts of the first planetary gearing, and means to brake a second of the four gearing parts of the secondary planetary gearing, together with means to drive only one further gearing part of only one of said two planetary gearings, and means for a further transfer of the drive from another further gearing part of the other of said two planetary gearings, a hydrodynamic coupling arranged within the named means for driving one gearing part, and means to couple the two halves of the hydrodynamic coupling together.

22. Planetary gearing aggregate including a first planetary gearing consisting of an outer central gear, a planet carrier having a set of planet gears and a sun gear, and a second planetary gearing consisting of a planet carrier, two substantially identical sets of planet gears each of which consists of a pair of connected coaxial planet gears, at least three central gears, means to connect at least one of the three gearing parts of the first planetary gearing with at least one of the four gearing parts of the second planetary gearing, means to brake a second of the three gearing parts of the first planetary gearing and means to brake a second of the four gearing parts of the second planetary gearing, together with means to drive a further gearing part and means for a further transfer of the drive from another further gearing part of the two planetary gearings, one of these gearing parts belonging to the first planetary gearing and the other to the second planetary gearing, coupling means to connect two gearing parts of the first planetary gearing and coupling means to connect two gearing parts of the second planetary gearing with each other.

23. Planetary gearing aggregate including a first planetary gearing consisting of an outer central gear, a planet carrier having a set of planet gears and a sun gear, and a second planetary gearing consisting of a planet carrier, two substantially identical sets of planet gears each of which consists of a pair of connected coaxial planet gears, at least three central gears, means to connect at least one of the three gearing parts of the first planetary gearing with at least one of the four gearing parts of the second planetary gearing, means to brake a second of the three gearing parts of the first planetary gearing and means to brake a second of the four gearing parts of the second planetary gearing, together with means to drive a further gearing part and means for a further transfer of the drive from another further gearing part of the two planetary gearings, one of these gearing parts belonging to the first planetary gearing and the other to the second planetary gearing, coupling means to connect two gearing parts of the first planetary gearing and coupling means to connect two gearing parts of the second planetary gearing with each other, and further means to shift the just mentioned coupling means and the brake means by hydraulic auxiliary means.

24. Planetary gearing aggregate according to claim 23 in which said further auxiliary means includes a pump driven by the driving side and a pump driven by the driven side to feed fluid for shifting the coupling and brake means.

25. Planetary gearing aggregate including a first planetary gearing consisting of an outer central gear, a planet carrier having a set of planet gears and a sun gear, and a second planetary gearing consisting of a planet carrier, two substantially identical sets of planet gears each of which consists of a pair of connected coaxial planet gears, at least three central gears, means to connect at least one of the three gearing parts of the first planetary gearing with at least one of the four gearing parts of the second planetary gearing, means to brake a second of the three gearing parts of the first planetary gearing and means to brake a second of the four gearing parts of the second planetary gearing, together with means to drive a further gearing part and means for a further transfer of the drive from another further gearing part of the two planetary gearings, one of these gearing parts belonging to the first planetary gearing and the other to the second planetary gearing, an electromagnetic clutch to couple two gearing parts of the first planetary gearing and an electromagnetic clutch to couple two gearing parts of the second planetary gearing with each other.

26. A first planetary gearing comprising three gearing parts rotating about a common axis, a second planetary gearing including at least three parts rotating about a common axis, means connecting one of said three gearing parts of the first planetary gearing with one of said rotating parts of the second planetary gearing, means connecting another of said three gearing parts of the first planetary gearing with another of said rotating parts of the second planetary gearing, means for braking at least one of said connecting means, means to drive only one of said gearing parts of only said first planetary gearing, and means to transfer the drive from a third of said rotating parts of said second planetary gearing.

27. Planetary gearing aggregate including a first planetary gearing consisting of an outer central gear, a planet carrier having a set of planet gears and a sun gear, and a second planetary gearing including at least three rotating parts rotating about an axis, means to connect at least one of the three gearing parts of the first planetary gearing with at least one of said rotating parts of the second planetary gearing, means to brake a second of the three gearing parts of the first planetary gearing, means to brake a second of said second rotating parts of the second planetary gearing, means to drive the third of the three gearing parts of the first planetary gearing, means for a further transfer of the drive from a third of said rotating parts of the second planetary gearing, means to lock the first planetary gearing in itself, and means to lock the second planetary gearing in itself, so that each of these rotates as a unit.

28. A first planetary gearing comprising three gearing parts rotating about a common axis, a second planetary gearing including at least three parts rotating about a common axis, means connecting one of said three gearing parts of the first planetary gearing with one of said rotating parts of the second planetary gearing, means connecting another of said three gearing parts of the first planetary gearing with another of the rotating parts of the second planetary gearing, means for rendering inactive one of said connecting means, means for braking the rotating part connected with the other connecting means, means for locking said first planetary gearing in itself, means for locking said second planetary gearing in itself, so that each of them rotates as a unit, means to drive one of said three gearing parts of said first planetary gearing, and means to transfer the drive from a third of said rotating parts of said second planetary gearing.

29. Planetary gearing including a planet carrier, sets of pairs of coaxial planet gears supported on the planet carrier, each set connected to rotate together, a central gear engaged with one pair of the planet gears, a further central gear engaged with the other pair of planet gears, a drive shaft, means including a synchronizing coupling means for effecting a direct drive of one of said central gears by said drive shaft, a change-speed gear, means including said change-speed gearing for driving a second of said central gears by the drive shaft, means effecting a further transfer of the drive from said planetary gearing, a third central gear, and means to brake said third central gear.

References Cited in the file of this patent

UNITED STATES PATENTS

| Number | Name | Date |
|---|---|---|
| 588,657 | Reilly | Aug. 24, 1897 |
| 662,306 | Riker | Nov. 20, 1900 |
| 1,256,371 | Rowledge | Feb. 12, 1918 |
| 1,383,988 | De Normanville | July 5, 1921 |
| 2,123,770 | Cotal | July 12, 1938 |
| 2,155,198 | Lawrence | Apr. 18, 1939 |
| 2,195,783 | Ravigneaux | Apr. 2, 1940 |
| 2,220,174 | Ravigneaux | Nov. 5, 1940 |
| 2,251,464 | Neracher | Aug. 5, 1941 |
| 2,277,214 | Dodge | Mar. 24, 1942 |
| 2,466,320 | Lawrence | Apr. 5, 1949 |
| 2,529,423 | Schou | Nov. 7, 1950 |
| 2,530,200 | Hobbs | Nov. 14, 1950 |

FOREIGN PATENTS

| Number | Country | Date |
|---|---|---|
| 119,651 | Great Britain | July 29, 1919 |
| 150,336 | Germany | Apr. 13, 1904 |
| 438,459 | Great Britain | Nov. 18, 1935 |